US006961512B1

(12) United States Patent
Cho

(10) Patent No.: US 6,961,512 B1
(45) Date of Patent: Nov. 1, 2005

(54) SUBTITLE MANAGEMENT METHOD FOR DIGITAL VIDEO DISK

(75) Inventor: Jong-won Cho, Incheon (KR)

(73) Assignee: DVD Tech Co., Ltd., Seoul (KR)

( * ) Notice: Subject to any disclaimer, the term of this patent is extended or adjusted under 35 U.S.C. 154(b) by 0 days.

(21) Appl. No.: 10/009,781

(22) PCT Filed: May 25, 2000

(86) PCT No.: PCT/KR00/00533

§ 371 (c)(1), (2), (4) Date: Dec. 17, 2001

(87) PCT Pub. No.: WO01/48756

PCT Pub. Date: Jul. 5, 2001

(30) Foreign Application Priority Data

Dec. 27, 1999 (KR) ............................... 1999-62986

(51) Int. Cl.[7] ............................................. H04N 5/781

(52) U.S. Cl. ........................ 386/95; 386/125; 348/563; 348/423.1

(58) Field of Search ........................ 386/1, 45, 95–106, 386/125–126; 348/423.1, 563, 564–565, 348/473, 474; H04N 5/448, 5/781

(56) References Cited

U.S. PATENT DOCUMENTS 6,198,511 B1 * 3/2001 Matz et al. ................. 348/553
6,512,552 B1 * 1/2003 Subramanian .............. 348/564
2002/0136529 A1 9/2002 Yamashita et al.

FOREIGN PATENT DOCUMENTS

JP 11-75113 3/1999
JP 2000-253312 9/2000

* cited by examiner

*Primary Examiner*—Thai Tran
(74) *Attorney, Agent, or Firm*—Leydig, Voit & Mayer, Ltd.

(57) ABSTRACT

A method of processing a caption for a digital video disk (DVD) includes loading a prepared caption script of a predetermined language in a caption indicator, showing a moving picture corresponding to the caption script and ascertaining the caption generation point and caption annihilation point of the shown moving picture, writing time codes corresponding to the caption generation point and the caption annihilation point and displaying a list of caption scripts and a list of time codes on the caption indicator, checking the state of the time codes and the state of a corresponding caption displayed, and correcting the state of the time codes and the state of the corresponding caption displayed, and correcting the state of the time codes and the state of the corresponding caption displayed if an error is detected, and producing the caption scripts and the time codes in a scrip file.

6 Claims, 5 Drawing Sheets

SUBTITLE MANAGEMENT METHOD FOR DIGITAL VIDEO DISK

TECHNICAL FIELD

The present invention relates to a method of processing a caption of a digital video disk, and more particularly, to a method of processing a caption of a digital video disk, by which a plurality of language captions are written within a single moving picture running time using a point in time when the caption of a moving picture is generated and a point in time when the caption of the moving picture is ended.

BACKGROUND ART

General digital video disks (DVDs) are storage media which can store a variety of digital information such as video information and audio information. In particular, DVD movies have the convenience and various functions that cannot be found in existing storage media. Among captions used in DVDs, captions that are used for people who have difficulty in hearing or for the purpose of learning can be produced in a maximum of 32 different languages and inserted, so that a user can easily select and watch a desired language in a movie.

FIG. 1 illustrates the entire process for producing a DVD film. Referring to FIG. 1, in the first stage, there is a film selection step 1 in which a film to be produced as a DVD title is selected among released films or to-be-released films. The second stage includes a video data encoding step 2, an acoustic data encoding step 3 and a sub-picture producing step 4. In the video data encoding step 2, the master of the selected film is encoded in an MPEG-2 file format suitable for a DVD manufacturing through a telecine operation. In the acoustic data encoding step 3, the format of a multichannel sound in the selected film is converted into a format suitable for a DVD acoustic format, for example, AC-3. Multilingual audio support which covers a maximum of 8 languages is carried out in the step 3. The sub-picture producing step 4 is for performing a menu function and processing a caption on a DVD. Moving pictures and still pictures can be used on a menu, and multilingual captioning can cover a maximum of 32 languages. The third stage includes a DVD authoring step 5 in which a picture, a sound, a menu and a caption are united and an area code, a copying prevention code and the like are added to the united result to thereby form a stream. The fourth stage includes a step 6 in which the thus-formed stream is stored in a large-capacity storage medium such as a digital layer tape (DLT) or a DVD-ROM.

FIG. 2 is a flowchart for illustrating a conventional DVD caption producing process. Referring to FIG. 2, a time code is extracted from a moving picture 11 to be produced for DVDs, using a text file 10 of a primitive multilingual caption, in step 12. A caption corresponding to each language is inserted according to an extracted time code, in step 13, while the caption is produced in the format of a graphic file BMP or a text file, so that the graphic file BMP or the text file is adjusted corresponding to the time code. Then, the caption corresponding to each language undergoes a timing inspection for determining whether a caption generation point and a caption concluding point are proper and undergoes correction, in step 14. A primitive file into which a time code has been completely inserted is converted into a script dedicated file, in step 15. Thereafter, the script file is finally input to a DVD authoring program 16.

In a conventional DVD caption producing process as described with reference to FIG. 2, a caption for DVD films is produced and inserted in the format of a graphic file or test file in an authoring process. Also, generation of a time code for designating a caption generation point and a caption ending point is complicated and time-consuming in the case of moving pictures which require a two-hour running time on the average and no less than 1500 times of captions for movie speech. Therefore, in case that a caption is inserted in a plurality of languages, a caption corresponding to each of the languages must be inserted, so that additional working time and costs depending on the number of languages added are required.

DETAILED DISCLOSURE OF THE INVENTION

To solve the above problem, an objective of the present invention is to provide a method of processing a caption for a digital video disk (DVD), by which a script file is produced by extracting the exact number of image frames and an exact time code of the caption generation point and caption annihilation point of a moving picture, and a script file of caption scripts of a plurality of languages is produced using the formerly-produced script file, so that captions of a plurality of languages can be written within a single moving picture running time. Therefore, the operation time and cost for captioning can be reduced, and the exact caption generation point and the exact caption annihilation point can be recorded without errors just by a simple key input, so that rapid and efficient captioning is achieved.

To achieve the above objectives, the present invention provides a method of captioning a DVD, including: (a) loading a prepared caption script of a predetermined language in a caption indicator; (b) showing a moving picture corresponding to the caption script and ascertaining the caption generation point and caption ending point of the shown moving picture; (c) writing time codes corresponding to the caption generation point and the caption ending point and displaying a list of caption scripts and a list of time codes on the caption indicator; (d) checking the state of the time codes and the state of a corresponding caption displayed, and correcting the time codes and the corresponding caption displayed if something wrong is detected; and (e) producing the caption scripts and the time codes into a script file.

If it is determined that there is a caption script of a different language, loading the caption script of a different language in the caption indicator is further included between the steps (a) and (b). The step (b) is performed by a manual key input, and, if the ascertainment of the caption generation point and capion annihilation point of the caption corresponding to the moving picture is improper, the caption generation point and caption annihilation point of the preceding caption are ascertained. In step (c), the time codes are obtained by ascertaining the number of moving picture frames from the caption generation point to the caption annihilation point of the corresponding caption, and each of the caption scripts is displayed simultaneously together with the caption generation point and the caption annihilation point of the caption script. Step (d) includes substeps for determining whether the time codes match with the caption generation/annihilation points, for checking if each of the time codes is duplicated and for displaying the time codes and captions. Step (d) includes further substeps for ascertaining whether something wrong happens, and if so, identifying the time codes of the corresponding caption from the list of the caption scripts and time codes. Subsequently, while the moving picture corresponding to the identified time codes is shown, the inconsistencies between the time codes and the caption generation/annihilation points are corrected, and the duplicated time codes are corrected. Also, the poor state of the corresponding caption display is corrected. After the step (e), a determination is made as to whether there is a caption script of a different language. If there is a caption script of a different language, a script file of the caption script of a different language is produced using the time code of the former script file. If there are no caption scripts of different languages, the produced script file is stored.

According to the present invention, a script file is produced on the basis of exact time codes, and a script file of caption scripts of a plurality of languages is produced using the former script file, so that captions of a plurality of languages can be written within a single moving picture running time. Therefore, the operation time and cost for captioning can be reduced.

BEST MODE FOR CARRYING OUT THE INVENTION

Figure 1:
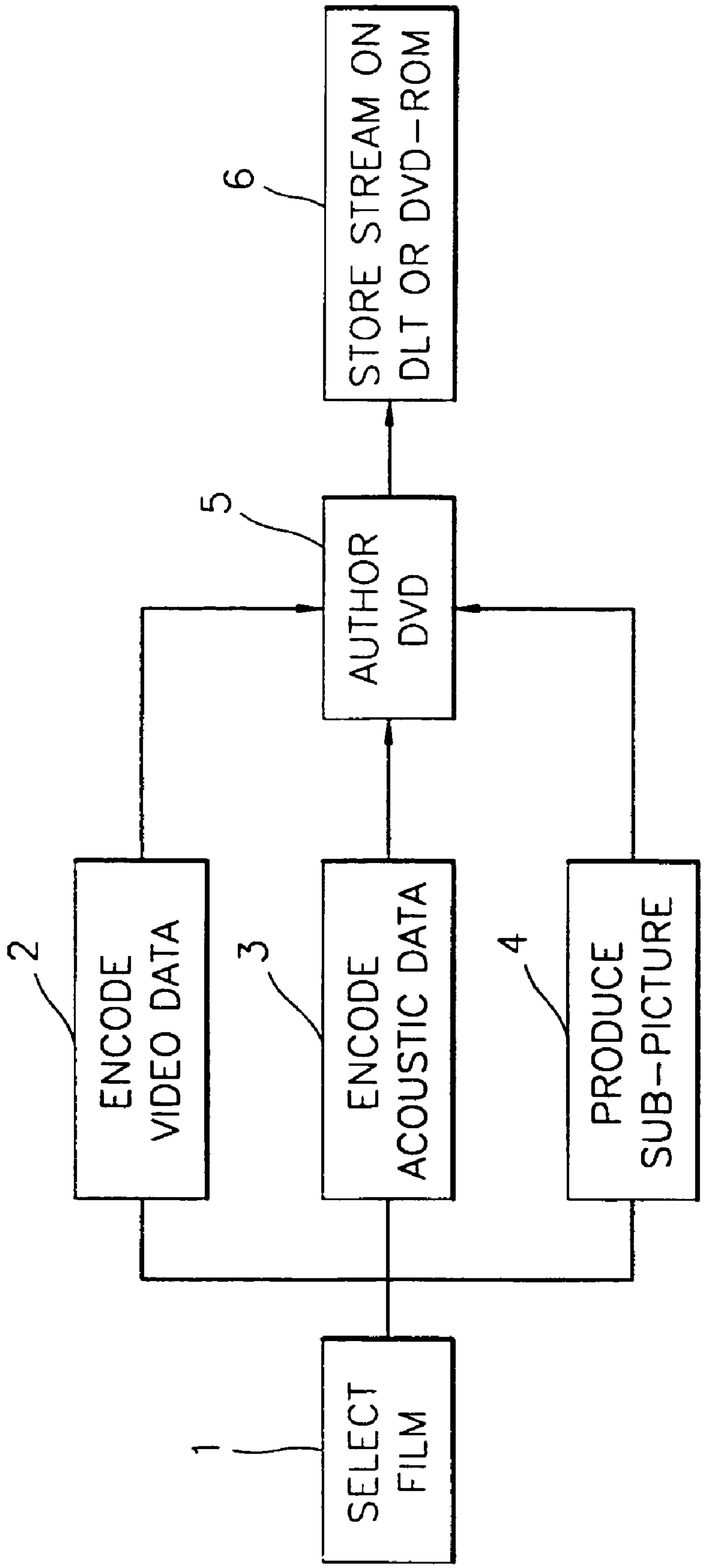
FIG. 1 is a conceptual diagram illustrating a process for manufacturing a general digital video disk (DVD)
Figure 2:
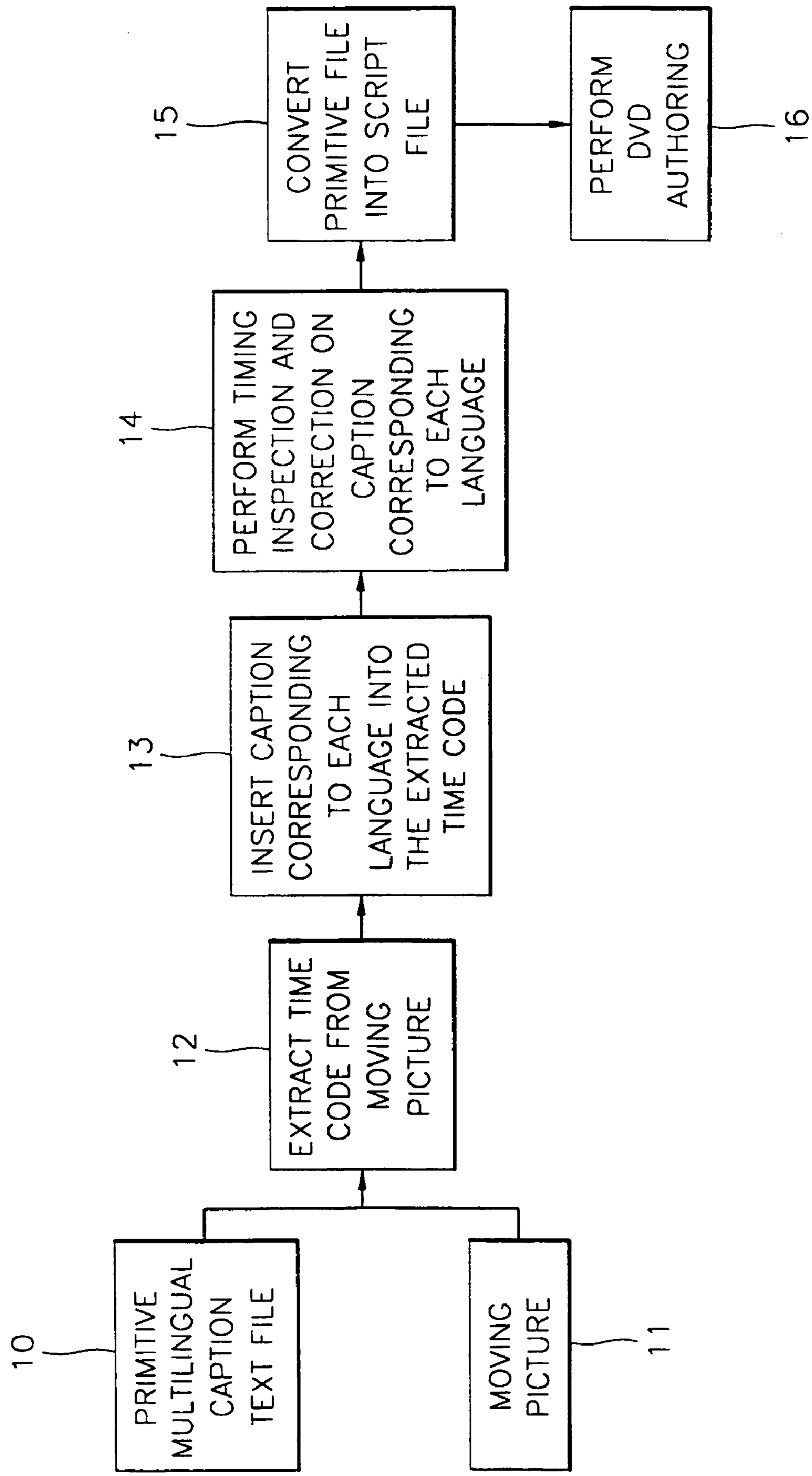
FIG. 2 is a flowchart illustrating a conventional DVD caption producing process.
Figure 3:
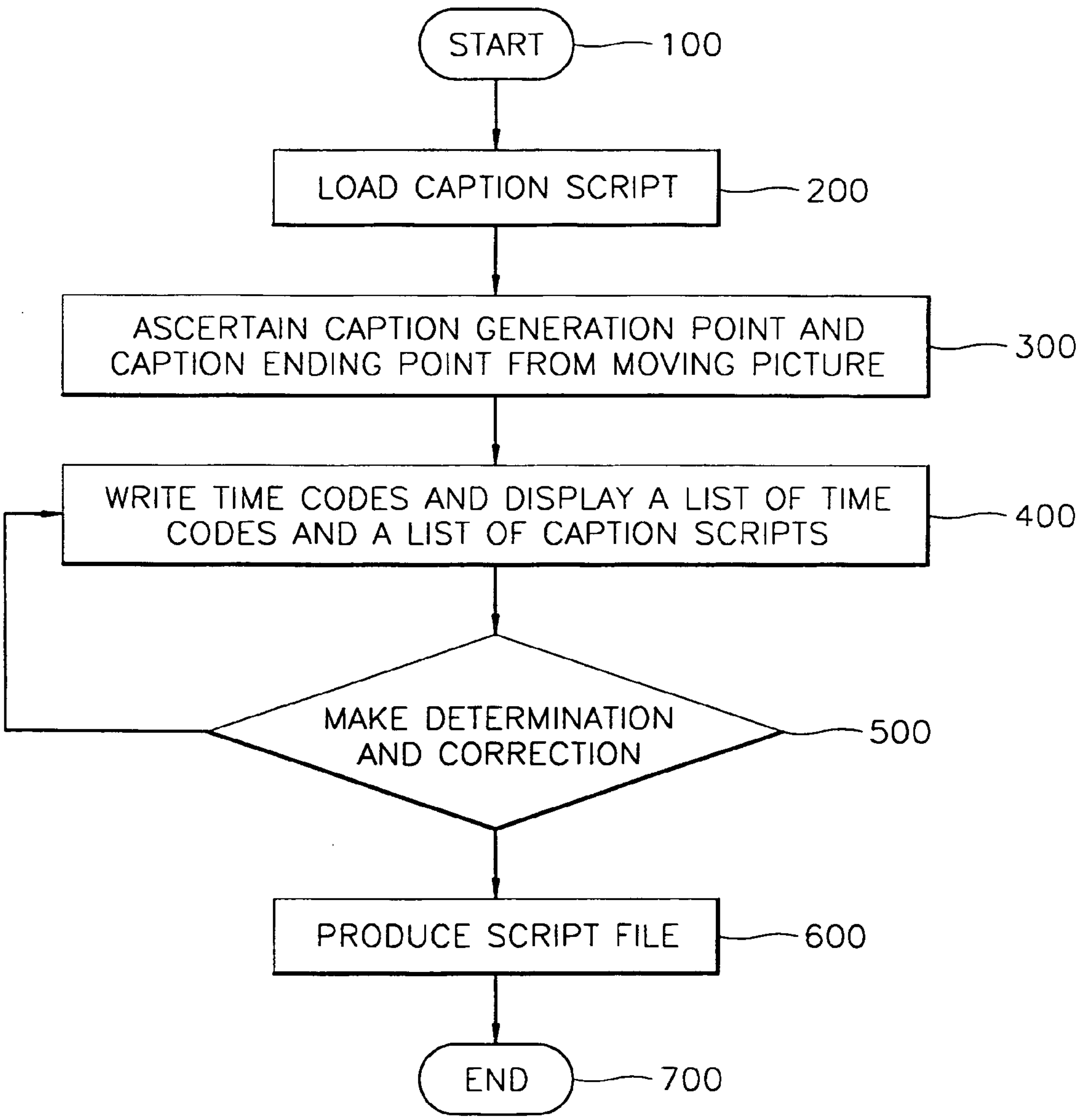
FIG. 3 is a flowchart illustrating a DVD caption processing method according to the present invention.

Referring to FIG. 3, first, a prepared caption script is input to and loaded in a caption indicator, in step 200. Next, a moving picture corresponding to the caption script is shown, and a caption generation point and a caption ending point are ascertained from the shown moving picture, in step 300. Then, time codes corresponding to the caption generation point and the caption ending point are written, and a list of caption scripts and a list of time codes are displayed on the caption indicator, in step 400. Thereafter, a determination is made as to whether the time codes matches with the caption generation point and the caption ending point, and a correction is made on the time codes, in step 500. Then, the caption scripts and the time codes are produced into a script file, in step 600.

Figure 4A:
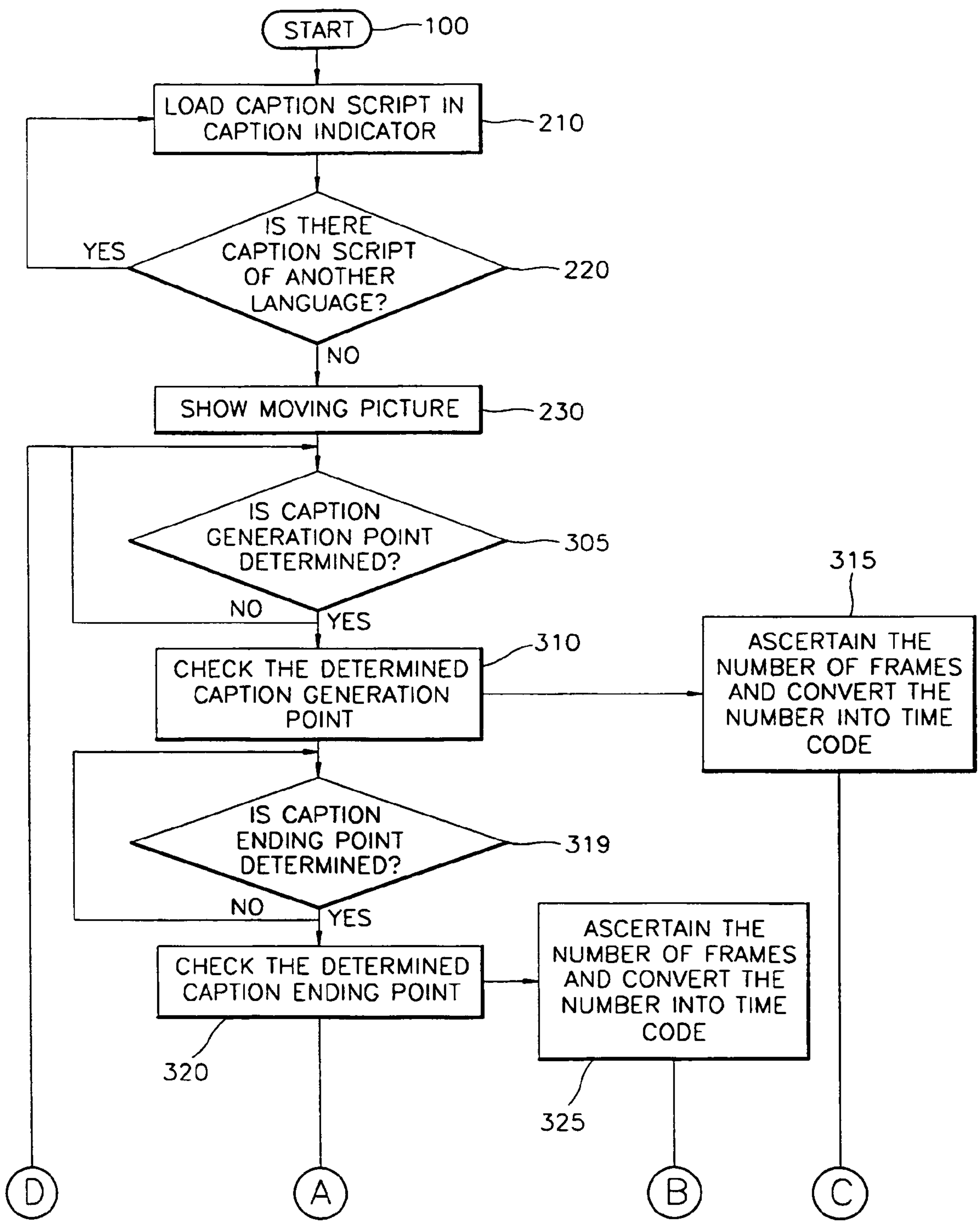
FIG. 4 is a flowchart illustrating an embodiment of a DVD caption processing method according to the present invention.
Figure 4B:
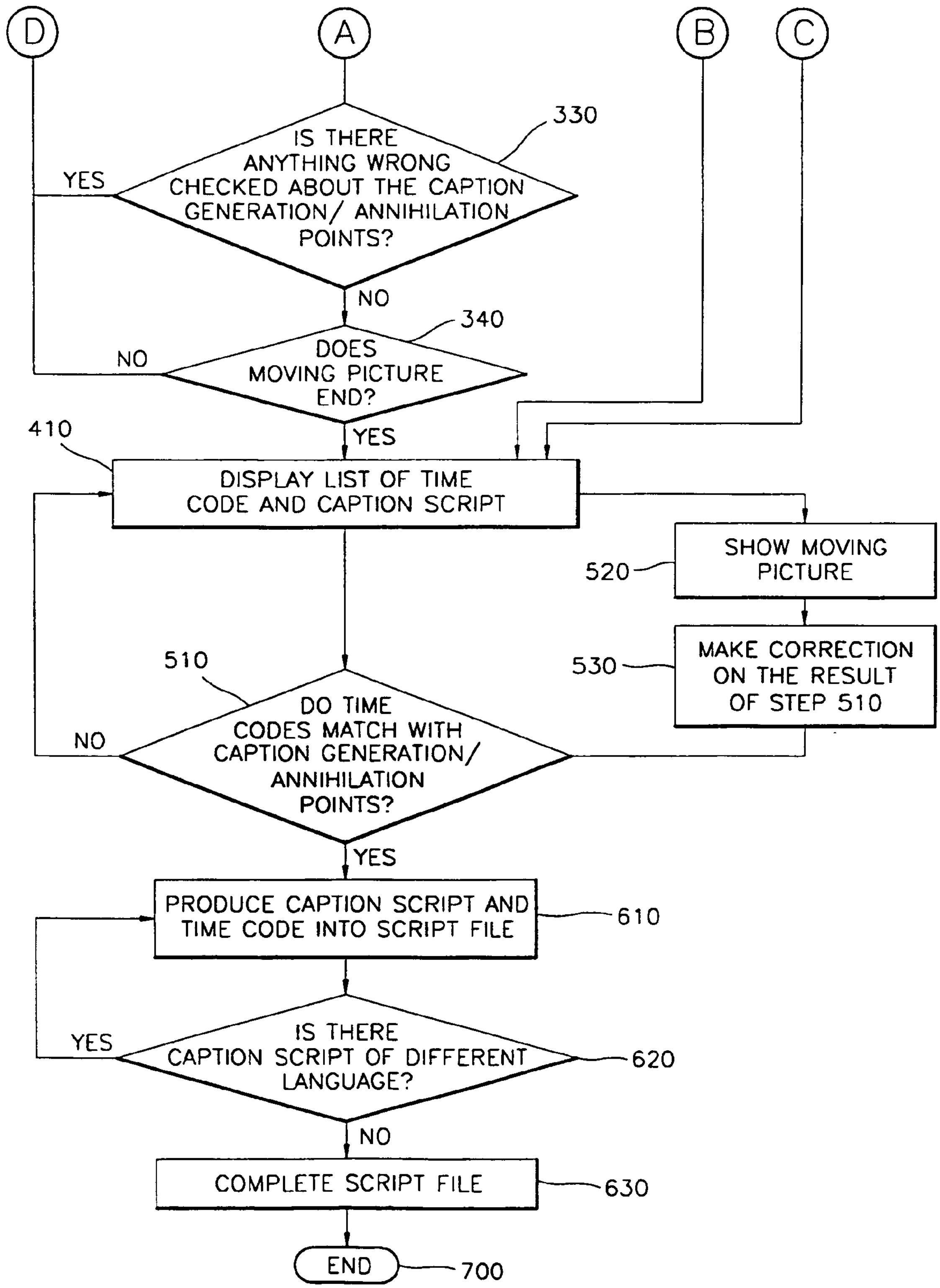

FIG. 4 is a flowchart illustrating an embodiment of a DVD caption processing method according to the present invention. Referring to FIG. 4, a caption script is input to and loaded in a caption indicator, in step 210. A determination is made as to whether there is a caption script of a different language, in step 220. If there is a caption script of a different language, this caption script is loaded in the caption indicator. If there are no caption scripts of different languages, a moving picture corresponding to the input caption script is shown, in step 230. A point when the caption of the shown moving picture is generated and a point when the caption of the shown moving picture ends are determined in steps 305 and 319, respectively. Determinations of the caption generation point and the caption ending point are performed by a manual key input in steps 310 and 320, respectively. If it is determined in step 330 that the corresponding caption generation/annihilation points are improper, a caption prior to the corresponding caption is checked to determine again the caption generation/annihilation points thereof. Time codes corresponding to the caption generation point and the caption ending point are written in steps 315 and 325, respectively, and a list of caption scripts and a list of time codes are displayed on the caption indicator, in step 410. Here, the time codes are obtained from a moving picture frame corresponding to the caption generation point and a moving picture frame corresponding to the caption ending point. In step 410, individual caption scripts and the caption generation point and caption ending point of the individual caption scripts are simultaneously displayed. A determination is made as to whether each of the time codes matches with the caption generation point and the caption ending point, in step 510. The step 510 includes a process for detecting duplication of time codes and checking the state of a caption display. If the time code does not match with its corresponding caption generation/annihilation points, or if the time code is duplicated or if the state of the caption display is poor, the corresponding time code is identified and selected from the lists of caption scripts and time codes in step 410. While a moving picture corresponding to the selected time code is shown in step 520, the inconsistency between the time code and the caption generation/annihilation points is corrected and duplication of the time code is corrected in step 530. Also, the poor state of a caption display is corrected in step 530. The caption script and the time code are produced into a script file, in step 610. A determination is made as to whether there is a caption script of another language in the script file generation step, in step 620. If there is a caption script of another language, a script file of the caption script of the different language is produced using the time code of the former script file. If there are no caption scripts of different languages, the produced script file is completed, in step 630.

That is, caption scripts written in different languages are loaded in a caption indicator, and a DVD moving picture captured by a high-performance capture board having no frame drops is shown. A user generates signals relating to a caption generation point and a caption annihilation point of caption data loaded in a list indicator on which caption scripts are sequentially displayed, using a keyboard while viewing a moving picture. After the keyboard input is made by a user, a frame corresponding to the caption generation point and the caption annihilation point is identified and converted into a time code, whereby the caption generation point and the caption annihilation point are recorded on the list indicator. In contrast with a conventional caption processing method of manually writing time codes while scanning their corresponding moving pictures one by one, in the present invention, an exact caption generation point and an exact caption annihilation point can be recorded without errors just by a simple keyboard manipulation, and time codes for a plurality of captions can be produced by a single operation. Thus, captioning requires only as much period of time as the running time of a moving picture, so that captioning is rapid and efficient. The lip sync of a moving picture and a caption can be precisely adjusted by a time shift function of shifting the time of the entire caption and a time code ratio adjusting function by which an individual caption can be extended or shrunk at a predetermined ratio. Also, the operation of a script file can be improved by a wide range of option of a style of handwriting such as the size of a caption, the font type of caption, and the like.

INDUSTRIAL APPLICABILITY

In a method of captioning a digital video disk (DVD) according to the present invention as described above, a script file is produced by extracting an exact time code of the caption generation point and caption annihilation point of a moving picture, and a script file of caption scripts of a plurality of languages is produced using the former script file. This enables captions of a plurality of languages to be written within a single moving picture running time, thereby reducing the operation time for captioning up to 1/10 to 1/30 compared to the conventional captioning method. Therefore, this method can be simply performed at low costs, and thus is economical. Also, in this method, the exact caption generation point and the exact caption annihilation point can be recorded without errors just by a simple key input, so that rapid and efficient captioning is achieved.

What is claimed is:

1. A method of captioning a digital video disk (DVD), comprising:

(a) loading a prepared caption script in a first language into a caption indicator;

(b) showing a moving picture corresponding to the caption script and ascertaining caption generation and caption annihilation points of the moving picture;

(c) writing time codes corresponding to the caption generation point and the caption ending point and displaying a list of caption scripts and a list of time codes on the caption indicator;

(d) checking state of the time codes and state of a corresponding caption displayed, and correcting the state of the time codes and the state of the corresponding caption displayed if an error is detected; and (e) producing the caption scripts and the time codes in a script file.

2. The method of claim 1, wherein, if it is determined that there is a caption script in a second language, loading the caption script of the second language in the caption indicator between the steps (a) and (b).

3. The method of claim 1, wherein the step (b) is performed by a manual key input, and, if the ascertaining of the caption generation point and caption annihilation point of the corresponding caption corresponding to the moving picture is erroneous, ascertaining the caption generation point and caption annihilation point of the caption preceding the corresponding caption.

4. The method of claim 1, wherein, in step (c), the time codes are obtained by ascertaining number of moving picture frames at the caption generation point and caption annihilation point of the corresponding caption, and displaying each of the caption scripts simultaneously with the caption generation point and the caption annihilation point of the caption script.

5. The method of claim 1, wherein the state of the time codes in step (d) includes whether the time codes match with the caption generation point and the caption annihilation point and whether each of the time codes is duplicated, and, if an error is detected, the step (d) comprises identifying and selecting the time codes of the corresponding caption from a list of caption subscripts and time codes and correcting inconsistency between the time codes and the caption generation point and caption annihilation point, duplication of the time codes, or the state of the corresponding caption displayed while showing a moving picture corresponding to the selected time codes.

6. The method of claim 1, further comprising, after the step (e):

determining whether there is a caption script in a second language and, if so, producing a script file of the caption script of the second language using the time codes of the former script file; and storing the script file produced if there are no caption scripts in different languages.

* * * * *